United States Patent [19]

Compaan

[11] Patent Number: 4,464,741
[45] Date of Patent: Aug. 7, 1984

[54] OPTICAL FOCUSING-ERROR DETECTION DEVICE

[75] Inventor: Klaas Compaan, Eindhoven, Netherlands

[73] Assignee: U.S. Philips Corporation, New York, N.Y.

[21] Appl. No.: 354,324

[22] Filed: Mar. 3, 1982

[30] Foreign Application Priority Data

Dec. 11, 1981 [NL] Netherlands .......................... 8105579

[51] Int. Cl.$^3$ .............................................. G11B 7/00
[52] U.S. Cl. ...................................... 369/45; 369/46; 369/112
[58] Field of Search ................... 369/44, 45, 46, 111, 369/112, 116; 346/76 L, 108; 250/201, 202, 204; 350/255, 433

[56] References Cited

U.S. PATENT DOCUMENTS

| 4,011,400 | 3/1977 | Simons et al. ................... 369/46 X |
| 4,025,949 | 5/1977 | Whitman ................................ 369/45 |
| 4,123,652 | 10/1978 | Bouwhuis .......................... 369/45 X |
| 4,344,164 | 8/1982 | Bricot et al. .................... 369/116 X |

Primary Examiner—Donald E. McElheny, Jr.
Attorney, Agent, or Firm—Robert T. Mayer; Algy Tamoshunas

[57] ABSTRACT

An optical focusing error-detection device is disclosed which comprises a radiation-sensitive detector with four sub-detectors, and an astigmatic lens system arranged between the detector and the objective system whose focusing-error is to be detected. The astigmatic system is arranged in a non-collimated beam and comprises two cylindrical lenses having mutually perpendicular axes and having different powers so that the resulting focusing-error signal is symmetrical and linear around the zero point.

7 Claims, 7 Drawing Figures

OPTICAL FOCUSING-ERROR DETECTION DEVICE

BACKGROUND OF THE INVENTION

The invention relates to an optical focusing-error detection device for determining deviations between the plane of imaging of an objective system in an optical apparatus and a radiation-reflecting surface in said apparatus on which surface an image is to be formed. Such a focusing-error detection device comprises a radiation source, the objective system, an astigmatic system comprising two cylindrical lenses arranged in the path of a beam reflected by the reflecting surface, and a radiation-sensitive detector comprising four sub-detectors.

Such a focusing-error detection device may be employed in an apparatus for reading a record carrier having an optically readable radiation-reflecting information structure in order to keep the read beam focused on the information structure.

Such read apparatus is known, inter alia from U.S. Pat. No. 4,025,949. This apparatus is for example employed for reading a record carrier on which a video program is stored. The information structure then comprises a multitude of information areas which, in the track direction, alternate with intermediate areas. The areas may for example be arranged along a spiral track. The information areas have a different influence on the read beam than the intermediate areas. The information may be encoded in the frequency of the information areas and/or in the ratio of the length of said areas relative to that of the intermediate areas. Alternatively the information may be encoded in digital form. Apart from video and audio information, the record carrier may contain digital information, for example, supplied by and to a computer.

For a sufficiently long playing time of the record carrier, when the record carrier has limited dimensions, the details of the information structure will be very small. For example, if a thirty-minute video program is stored on one side of a round disc-shaped record carrier in an angular area having an outer radius of approximately 15 centimeters and an inner radius of approximately 6 centimeters, the width of the tracks will be approximately 0.6 microns and the average length of the information areas will be of the order of one micron.

In order to enable such small details to be read an objective system having a comparatively large numerical aperture must be used. However, the depth of focus of such an objective system is small. Since in the read apparatus the distance between the plane of the information structure and the objective system may vary beyond the range of the depth of focus, steps must be taken in order to detect said variations and to correct the focusing in response thereto.

For this purpose the read beam received from the record carrier may be rendered astigmatic by means of, for example, a cylindrical lens. Between the focal lines of the astigmatic system comprising the objective system and the cylindrical lens a radiation-sensitive detector comprising four sub-detectors may be arranged. If the position of the plane of the information structure relative to the objective system varies, the shape of the image spot formed on the composite detector will change. This change of shape can be detected by appropriately combining the output signals of the sub-detectors.

Such a focusing-error detection device is suitable not only for use in apparatus for reading a radiation-reflecting record carrier, but in general it may be employed in optical apparatus in which it is required to detect deviations between the desired and the actual position of the radiation-reflecting surface onto which an image is to be formed. Examples of this are microscopes, apparatus employed in the fabrication of integrated circuits for projecting a mask onto a substrate, etc.

The focusing-error detection device using one cylindrical lens supplies a signal which is not ideal for control purposes. The characteristic representing the variation of the focusing-error signal as a function of the deviation between the desired and the actual plane of focusing is curved and, in addition, it is asymmetrical around the zero point. The non-linear variation is caused by the different convergence of the beam in two mutually perpendicular directions. The asymmetrical shape of the characteristic is caused by the non-symmetrical position of the images of the pupil of the objective system relative to the plane of the sub-detectors. This asymmetry is particularly serious if the radiation-sensitive detector is disposed at a comparatively large distance from the objective system, which situation may occur in a write or read apparatus in which only the objective system is movable and the other optical elements of the apparatus are stationary.

In U.S. Pat. No. 4,025,949 it is proposed to improve the characteristic of the focusing-error signal by means of two cylindrical lenses of equal power whose cylinder axes are transverse to each other, which lenses are disposed in a parallel beam. This yields a beam having the same convergence in two mutually perpendicular planes, so that the focusing-error signal varies linearly around the zero point. However, now the images of the objective pupil are still non-symmetrical relative to the detector plane, so that the signal remains asymmetrical.

SUMMARY OF THE INVENTION

It is an object of the present invention to provide a focusing-error detection device which supplies a signal which is both linear around the zero point and symmetrical, not only around the zero point but also beyond the zero point. The device in accordance with the invention is characterized in that the two cylindrical lenses are arranged in a non-collimated beam and have different lens powers, in such a way that the images of the pupil of the objective system formed by means of said lenses are disposed symmetrically relative to the plane of the detector, and in that the beam emerging from said lenses has the same convergence in two mutually perpendicular planes.

A first, preferred, embodiment of the focusing-error detection device is further characterized in that the two cylindrical lenses are arranged in a convergent beam and are both negative lenses.

A second embodiment of the focusing-error detection device is further characterized in that the two cylindrical lenses are arranged in a divergent beam and are both positive lenses.

The focusing-error detection device may advantageously be used in a read apparatus or in a combined write/read apparatus, in which the detector of the focusing-error detection device is disposed at a large distance from the objective system.

BRIEF DESCRIPTION OF THE DRAWINGS

The invention will now be described in more detail, by way of example, by describing its use in a read apparatus and in a combined write/read apparatus. For this reference is made to the drawing, in which.

DESCRIPTION OF THE PREFERRED EMBODIMENTS

Figure 1:
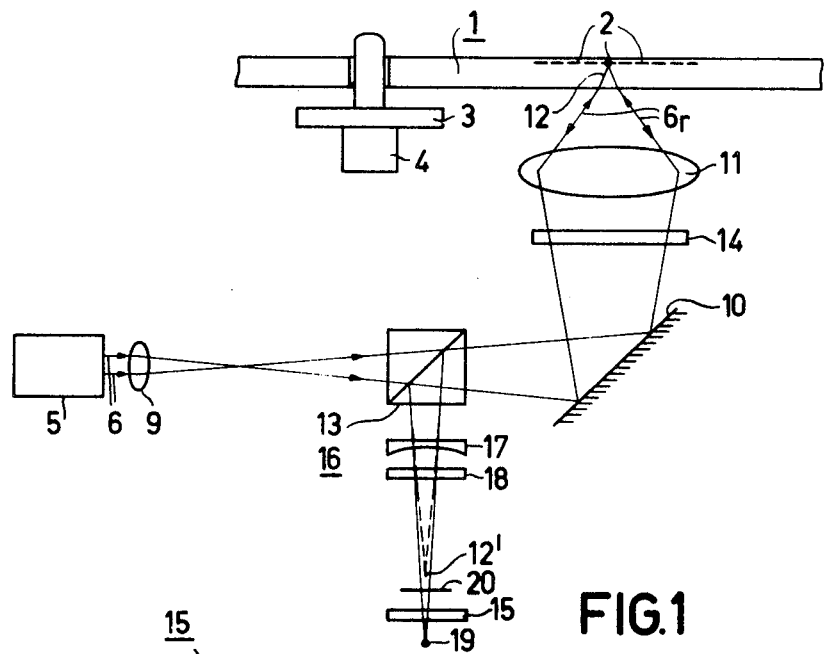
FIG. 1 shows a read apparatus equipped with the focusing-error detection device.

FIG. 1 shows a disc-shaped record carrier 1 in radial cross-section. The information structure is represented by the information tracks 2. The record carrier is illuminated by a read beam 6 emitted by a radiation source 5 which may for example comprise a gas laser, such as a He-Ne laser, or a semiconductor-diode laser, such as an AlGaAs laser. An objective system, which for simplicity is represented by a single lens 11, focuses the read beam so as to form a read spot 12 in the plane of the information tracks 2. The focal length of an optional auxiliary lens 9 is selected so that the pupil of the objective system is adequately filled, as a result of which the read spot has the diffraction-limited dimensions corresponding to the numerical aperture of the objective system. The read beam is reflected by the record carrier and, when the record carrier is rotated by means of the turntable 3 driven by the motor 4, it is modulated in accordance with the information contained in a track portion to be read.

A beam-splitting element 13 reflects the modulated beam to a radiation-sensitive detector 15 which converts this beam into an electric signal. The beam-splitting element may comprise a semitransparent mirror, but alternatively a polarisation-sensitive splitter prism may be used. In the last-mentioned case a $\lambda/4$ plate 14, $\lambda$ being the wavelength of the read beam, is arranged in the radiation path.

Figure 2:
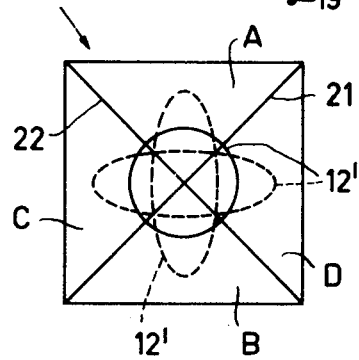
FIG. 2 shows the radiation-sensitive detector employed in this apparatus.

In order to detect deviations between the plane of focusing of the objective system and the plane of the information structure, i.e. focusing errors, an astigmatic system 16 is arranged in the radiation path behind the beam splitter, and the detector comprises four subdetectors. This detector is represented in FIG. 2. The astigmatic optical system comprising the objective system 11 and the system 16 images the read spot 12 as two astigmatic focal lines 19 and 20. One line, 20, is disposed in the plane of the drawing and the second line, 19, is disposed transversely of this plane. The detector 15 is arranged in a plane which, viewed along the optical axis, is disposed between the focal lines 19 and 20. The separating lines between the sub-detectors A, B, C and D are disposed at an angle of 45° to the astigmatic focal lines 19 and 20 and are preferably parallel and perpendicular respectively to the track direction at the location of the read spot.

The shape of the radiation spot 12' formed on the detector 15 depends on the degree of focusing of the beam 6 on the information surface. In the case of correct focusing, the radiation spot is circular, as is represented by the circle in FIG. 2. In the case of a focusing error, the radiation spot 12' will have an elongate shape as is represented by the broken lines, the longitudinal direction of the spot being dependent on the sign of the focusing error. If the signals from the sub-detectors are represented by $S_A$, $S_B$, $S_C$ and $S_D$, the focusing-error signal $S_f$ will be given by:

$$S_f = (S_A + S_B) - (S_C + S_D).$$

In accordance with the invention the astigmatic system 16 comprises two cylindrical lenses 17 and 18 of different powers and having mutually perpendicular cylinder axes. In the situation represented in FIG. 1, in which the lenses 17 and 18 are arranged in a convergent beam, said lenses are negative lenses. If the lenses are arranged in a divergent beam, positive lenses must be used. In the last-mentioned case, where a divergent beam is to be converted into a convergent beam, the lenses 17 and 18 should have a greater power than for the case where the beam is already convergent. Therefore, the embodiment with a convergent beam 6' and two divergent lenses 17 and 18 is preferred. The cylindrical lenses 17 and 18 have such powers that the images of the pupil of the objective system formed by means of these lenses are symmetrical relative to the plane of the detector 15.

Figure 3:
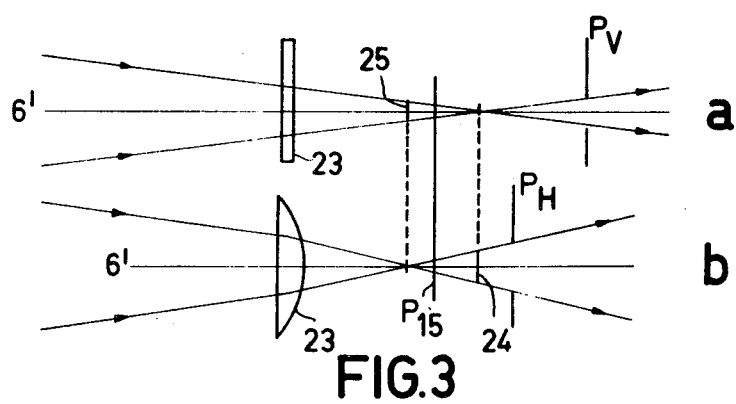
FIGS. 3a and 3b illustrate the variation of a radiation beam in a known focusing-error detection device comprising one cylindrical lens.

The advantage of the use of two cylindrical lenses can be best understood by first describing a focusing-error detection device which comprises only one positive cylindrical lens 23, for example at the location of the lens 17 in FIG. 1. In FIGS. 3a and 3b the part of the radiation path after the lens 23 is shown, FIG. 3a being a sectional view in the plane of drawing of FIG. 1 and FIG. 3b being a sectional view in a plane transverse to the plane of the drawing of FIG. 1. The astigmatic focal lines are designated 24 and 25 and the location of the detector 15 is designated P15.

Figure 4:
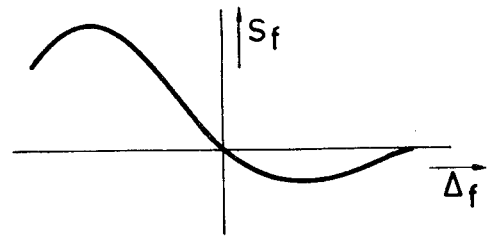
FIG. 4 represents the characteristic of the focusing-error signal of a detection device comprising one cylindrical lens.

Since the lens 23 has a lens action in only one plane, the plane of drawing of FIG. 3b, the convergence of the beam in the two cross-sections is not the same. As a result of this the focusing-error signal will vary non-linearly around the zero point. FIG. 4 represents the variation of this signal $S_f$ as a function of the focusing-error $\Delta f$. Apart from being curved around the zero point the signal $S_f$ is asymmetrical. This is because the images of the pupil of the objective system in the two planes of section shown in FIGS. 3a and 3b are not symmetrical relative to the plane P15 of the detector. Said pupil images are situated at the locations $P_V$ and $P_H$. A signal $S_f$ with the characteristic shown in FIG. 4 is not very advantageous for the servo system by means of which the focusing is to be corrected. The focusing can be corrected by, for example, moving the objective system.

Figure 6:
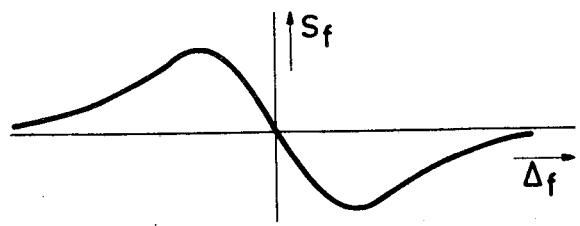
FIG. 6 represents the characteristic of the focusing-error signal supplied by this focusing-error detection device and FIG. 7 represents a combined write/read apparatus comprising two focusing-error detection devices in accordance with the invention.

Arranging two cylindrical lenses in a convergent or a divergent beam, in accordance with the invention, provides a first variable parameter, namely the position of these lenses relative to the objective system. A second variable parameter is then the power of the cylindrical lenses. A suitable choice of these two parameters results in equal convergences in the two beam cross-sections and in the pupil images being disposed symmetrically relative to the detector plane. As a result of this the signal $S_f$ will vary linearly around the zero point and the signal will by symmetrical, not only around the zero point, but also beyond the zero point, as is shown in FIG. 6.

If the two cylindrical lenses are arranged in a parallel beam, as is proposed in U.S. Pat. No. 4,025,949, the positions of these lenses do not influence the radiation path. This only enables equal convergences to be obtained in the two beam cross-sections, namely by the use of cylindrical lenses of equal power.

Figure 5:
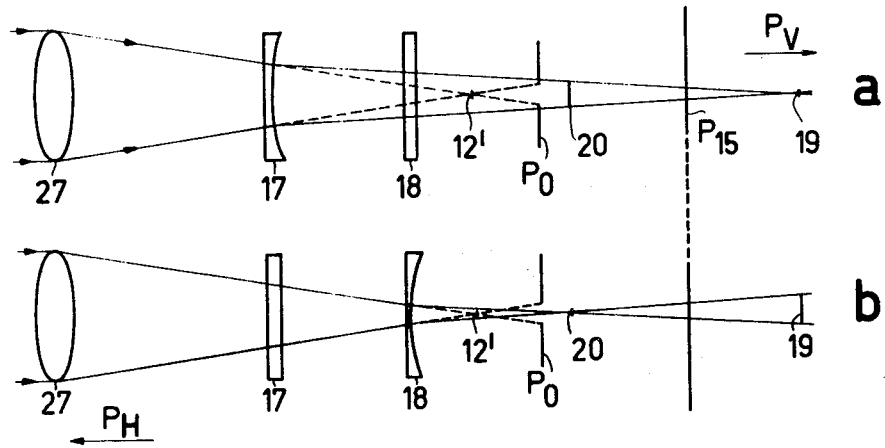
FIGS. 5a and 5b represent the variation of a radiation beam in a focusing-error detection device in accordance with the invention comprising two cylindrical lenses.

FIGS. 5a and 5b represent the radiation path in a focusing-error detection device in accordance with the invention. The two, negative, cylindrical lenses are designated 17 and 18. In the absence of these lenses the beam 6' would be focused in point 12' and the pupil of the objective system would be imaged at the location $P_o$. When the cylindrical lenses 17 and 18 are present two astigmatic focal lines 19 and 20 are formed. The cylindrical lens 17 images the pupil of the objective system in the plane $P_v$, which is disposed at a comparatively large distance from the detector plane P15. The cylindrical lens 18, which is more negative than the lens 17, images the pupil in a plane $P_H$ which is disposed to the left of the detector plane P15, namely at the same distance from this plane as $P_v$. The numeral 27 designates a convergent lens which is arranged in the radiation path if the beam emerging from the objective system is a collimated beam.

In a practical embodiment of the focusing-error detection device as shown in FIGS. 5a and 5b, used in an apparatus for reading an optical record carrier, the focal length of the lens 17 was approximately −80 mm, that of the lens 18 approximately −25 mm, and that of the lens 27 approximately 100 mm. The distance between the lenses 27 and 17 was approximately 51 mm and that between the lenses 17 and 18 approximately 33 nm. The distance between P15 and the lens 18 was approximately 64 mm.

Figure 7:
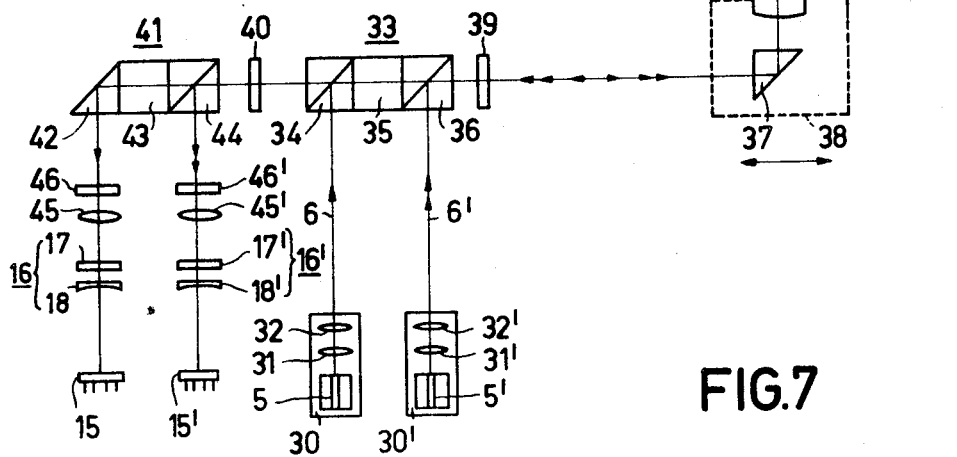

The invention may be used not only in an apparatus for reading an inscribed record carrier but also in an apparatus for inscribing a record carrier and in a combined write and read apparatus. FIG. 7 schematically represents an embodiment of the last-mentioned apparatus. In this apparatus two radiation spots are formed on the information surface, which viewed in the direction of the tracks 2, are disposed at a short distance from each other, for example 10 μm. The apparatus comprises a first radiation source 5 in the form of a diode laser, which produces a read beam 6. This diode laser forms part of a so-called light pen 30, which further comprises a collimator objective 31 which makes the beam parallel, and a cylindrical lens 32 for correcting the astigmatism of the diode-laser beam. In the path of the parallel beam 6 a composite prism 33 is arranged, which prism comprises a first, neutral, beam splitter 34 and a second, polarisation-sensitive, beam splitter 36. The prism 34 reflects a part of the beam 6 towards a reflecting prism 37, which reflects the beam towards the objective system 11, which focuses the beam so as to form a read spot in the information plane. The direction of polarisation of the beam 6 is selected so that the beam is transmitted by the polarisation-sensitive prism 36. Suitably, the objective system 11 and the prism 37 are arranged on a radially movable slide 38 and the other elements are stationary. The last-mentioned elements may be disposed at a comparatively large distance from the objective system.

A second light pen 30', which comprises a diode laser 5', a collimator objective 31', and a cylindrical lens 32', produces a collimated write beam 6'. The direction of polarisation of this beam is such that it is almost entirely reflected by the prism 36. Said beam then takes the same path as the read beam 6. Apart from being used for the actual writing process, the write beam 6' may be employed for reading servo information contained in prerecorded servo-tracks, in order to enable the position of the radiation spot in the radial and the tangential direction to be corrected.

The write beam and the read beam reflected by the record carrier should be incident on separate detectors 15' and 15, in such a way that radiation of the write beam and the read beam, respectively, does not reach the detector 15 and the detector 15', respectively. For this purpose use is made of beams of different directions of polarisation and polarisation-sensitive elements in the radiation path. In order to reduce any residual crosstalk use is made of diode lasers having different wavelengths, for example 840 nm for the write laser and 780 nm for the read laser, and wavelength-selective filters 46 and 46' are arranged before the detectors 15 and 15'.

In the radiation path a highly selective λ/4 plate 39 is arranged, which plate rotates the direction of polarisation of the write beam 6' only. This plate is traversed twice, so that the direction of polarisation of the beam 6' is rotated through 90° in total as a result of which the write beam reflected by the record carrier is transmitted by the prism 36. After having passed the composite prism 33 the beams 6 and 6', which have the same direction of polarisation, are incident on a second composite prism 41 which comprises a polarisation-sensitive beam splitter 44 and a reflecting prism 42. A highly selective λ/2-plate 40 is arranged before the composite prism 41, which plate only rotates the direction of polarisation of the write beam 6' through 90°. The prism 44 reflects this beam towards the detector 15'. The read beam b is transmitted by the prism 44 and is subsequently reflected to the detector by the prism 42.

In the path of the beam 6 a convergent lens 45 is arranged, which lens converts the parallel beam into a convergent beam. In order to derive a focusing-error signal, there is provided, in accordance with the invention, an astigmatic lens system 16 comprising two plano-concave cylindrical lenses 17 and 18 of different power and having mutually perpendicular cylinder axes, and the detector 15 comprises four sub-detectors, as shown in FIG. 2. These detectors, apart from being used for focusing-error detection, are also used for reading the recorded information and for detecting tracking errors.

Suitably, a converging lens 45' and two plano-concave cylindrical lenses 17' and 18' are arranged in the path of the write beam b' reflected by the prism 44, and the detector 15' comprises four sub-detectors. These detectors are used for reading a clock signal contained in prerecorded servo-tracks, for detecting tracking errors of the write spot and for detecting focusing errors of the write beam. This enables a difference in the foci of the write beam and the read beam to be corrected.

As will be apparent from the foregoing, the focusing-error detection device does not utilize special properties of the information structure, the record carrier, or the write- and/or read apparatus. The sole requirement is that the information surface is reflecting. Therefore, the invention may be employed in various apparatus in which a radiation spot is to be formed on a reflecting surface. Examples of this are a scanning microscope and an apparatus for projecting mask-patterns onto a substrate for the fabrication of integrated circuits, etc.

What is claimed is:

1. An optical focus error detection device for determining deviations between the image plane of an objective system in an optical apparatus and a radiation reflecting surface on which an image is to be formed, said device comprising means for producing a beam of radiation, optical means arranged in the path of said beam and comprising said objective system which focuses said beam to a first spot on said reflecting surface, said reflecting surface and said optical means being arranged such that at least a portion of the radiation incident on said reflecting surface is reflected back to said optical means and passes through said objective system, said optical means forming a non-collimated beam from said reflected radiation, a radiation sensitive detector comprising four sub-detectors, and an astigmatic system arranged in the path of said non-collimated beam so as to form a second spot on said detector having a shape which is dependent on the deviation of said reflecting surface from said image plane so that said sub-detectors supply output signals which are representative of said shape of said second spot and thus of said deviation, said astigmatic system comprising two cylindrical lenses having mutually perpendicular cylindrical axes and different lens powers, the positions of said cylindrical lenses relative to said objective system and said powers of said lenses being such that the beam emerging from said cylindrical lenses has the same convergence in two mutually perpendicular planes and the images of the pupil of said objective system formed by said cylindrical lenses are disposed symmetrically relative to the plane of said detector.

2. The device accordingly to claim 1 wherein said optical means includes means for separating said reflected radiation from the radiation of said beam traveling towards said reflecting surface and directing said separated reflected radiation towards said detector.

3. The detection device according to claim 1 wherein said non-collimated beam is convergent and said two cylindrical lenses are both negative lenses.

4. The detection system according to claim 1 wherein said non-collimated beam is divergent and said two cylindrical lenses are both positive lenses.

5. An apparatus for reading information stored in a radiation reflecting information structure on a record carrier, said apparatus comprising means for producing a beam of radiation, means for supporting the record carrier, optical means comprising an objective system for focusing said beam to a first spot on said radiation reflecting information structure, means for producing relative movement between said beam and said record carrier so that said first spot scans said information structure, said record carrier being supported by said supporting means relative to said optical means such that at least a portion of the radiation incident on said structure is reflected back to said optical means and passes through said objective system, said optical means forming a non-collimated beam from said reflected radiation, radiation sensitive means for deriving from said reflected radiation information read from said record carrier by said beam, said deriving means comprising a detector having four sub-detectors arranged in the path of said reflected radiation, and an astigmatic system disposed between said objective system and said detector in the path of said non-collimated beam so as to form a second spot on said detector having a shape which is dependent on deviation of said reflecting information structure from the image plane of said objective system so that said sub-detectors supply output signals which are representative of said shape of said second spot and thus of said deviation, said astigmatic system comprising two cylindrical lenses having mutually perpendicular cylindrical axes and different lens powers, the positions of said cylindrical lenses relative to said objective system and said powers of said lenses being such that the beam emerging from said cylindrical lenses has the same convergence in two mutually perpendicular planes and the images of the pupil of said objective system formed by said cylindrical lenses are disposed symmetrically relative to the plane of said detector.

6. An apparatus for optically recording and reading information on a reflective record carrier, said apparatus comprising first means for producing a read beam of radiation, second means for producing a write beam of radiation, means for supporting the record carrier, means for directing said read and write beams onto the record carrier, an objective system arranged so as to focus said read and write beams to a read and write spots on said record carrier, at least a portion of the radiation of said read and write beams incident on said record carrier being reflected thereby back through said objective system, means for separating the reflected read radiation from the reflected write radiation and directing said separated read and write radiation along different paths, means for forming a non-collimated beam from at least one of said reflected read and write radiation, and a focus error detection device comprising a radiation sensitive detector having four sub-detectors, and an astigmatic system arranged in the path of said non-collimated beam so as to form a second spot on said detector having a shape which is dependent on the deviation of said record carrier from the image plane of said objective system so that said sub-detectors supply output signals which are representative of said shape of said second spot and thus of said deviation, said astigmatic system comprising two cylindrical lenses having mutually perpendicular cylindrical axes and different lens powers, the positions of said cylindrical lenses relative to said objective system and said powers of said lenses being such that the beam emerging from said cylindrical lenses has the same convergence in two mutually perpendicular planes and the images of the pupil of said objective system formed by said cylindrical lenses are disposed symmetrically relative to the plane of said detector.

7. The apparatus according to claim 6 wherein said beam forming means forms a non-collimated beam from each of said read and write reflected radiation, and including two of said detection devices each arranged in the path of a respective one of said non-collimated beams formed from said read and write reflected radiation.

* * * * *